June 29, 1948.                M. L. TAYLOR ET AL                    2,444,208
                      CONTROL SYSTEM, APPARATUS, AND METHOD FOR
                          THE ELIMINATION OF ICE FROM AIRCRAFT
Filed Aug. 11, 1943                                          3 Sheets-Sheet 1

Fig.1.

INVENTORS
Myron L. Taylor
William B. Pond
Herbert A. Eayrs
By Herbert L. Davis, Jr.
Attorney Patented June 29, 1948

2,444,208

UNITED STATES PATENT OFFICE 2,444,208

CONTROL SYSTEM, APPARATUS, AND METHOD FOR THE ELIMINATION OF ICE FROM AIRCRAFT

Myron L. Taylor, Ridgewood, William B. Pond, West Englewood, and Herbert A. Eayrs, Tenafly, N. J., assignors to Bendix Aviation Corporation, Teterboro, N. J., a corporation of Delaware Application August 11, 1943, Serial No. 498,250

26 Claims. (Cl. 244—134)

Our present invention relates to a control system and more particularly to an Electronic Timer for controlling the inflation of suitable inflatable units or boots mounted upon airplane wings and other airfoils and surfaces of aircraft for the purpose of preventing the accumulation of ice.

The basic idea of the inflatable rubber boot for the removal of ice is to permit ice to form on a surface and then to distort that surface so as to break the ice into pieces free from the surface which can be carried away by the airstream, as shown for example in the Patent No. 1,990,866 to David Gregg, dated February 12, 1935, and owned by the assignee of the present application.

Such equipment as currently used on aircraft provides a constantly recurring cycle of inflation and deflation of tubes or boots along the leading edges of the protected airfoils. No adjustment or control of either the frequency or completeness of inflation cycles is provided. Unfortunately nature does not supply ice at a standard rate or to a standard texture. In recognition of this condition, an object of our invention is to provide an adjustable control for regulating the operation of the inflatable boots to suit the icing condition encountered.

In order to clarify the utility of the control it might be well to review some of the fundamentals of its operation. There are two principal factors in the problem of aircraft icing. One is the adhesion of the ice to the surface and the other is the continuity of the ice. Although both factors are normally present, either factor alone will retain an ice accretion. The natural lock of an ice formation over the leading edge of an airfoil will hold that formation in place, although its adhesion has been completely destroyed. Similarly, isolated particles of ice can be retained solely by their adhesion to the surface.

Fundamentally, the operation of inflatable boots for the removal of ice is based on playing the factors of continuity and adhesion against each other. It is because the ice adheres to the boot or tube element surface that the inflation of the tube elements breaks the continuity of the ice along the leading edge. Also is it only as the ice has continuity and enough tensile strength to maintain that continuity that the stretch of rubber produces a peeling action which destroys the adhesion and lets the airstream carry the ice away.

It has been observed that such inflatable boots give better ice removal if approximately an eighth of an inch of ice is allowed to accumulate before the boots are inflated. This is because the ice must build to a definite thickness in order to develop enough tensile strength to overcome adhesion. If the boots are operated with insufficient ice accumulated on them, the stretch of the rubber cracks the thin layer of ice, breaking it into many very small pieces, some of which are dislodged but most of which remain. Further accumulation of ice builds on the little particles which remain and thus develops a flexible ice which is really composed of a number of separate little islands. Once such a condition has been established the continuing cycles of inflation are relatively ineffective because further ice formation tends to accumulate only on the remaining particles and the stretch of the rubber naturally localizes in the areas between the islands without disturbing them.

Although operators have learned to allow a build-up of ice to accumulate before first putting the inflatable boots in operation there has heretofore been nothing they could do about the recurring cycles which automatically follows in sequence at intervals of approximately forty seconds. If the rate of ice accretion was only moderate, the amount of ice built up between the first and second cycle would be inadequate to afford good removal. Not only would such premature inflation remove little ice but worse, by cracking the ice it would ruin the possibilities of good ice removal thereafter. It is, therefore, an object of our invention to provide novel means whereby a flexible control of the recycling may be accomplished. Our system is particularly adapted for use as an electronic timer and control for a system of the manifold-solenoid operated type wherein there is provided pressure and suction manifolds and solenoid controlled distributing valves located at the individual boot connections such as shown in the copending application of Donald M. Lawrence, David Gregg, and Myron L. Taylor, Serial No. 498,248, filed August 11, 1943. The latter system has improved the rate of inflation and deflation of the boots and reduces the control of inflations to an electrical circuit operating the solenoids. Thus an object of our invention is to provide a flexible control system and electric timing mechanism for operating the aforenoted distributor valve solenoids.

Another object of our invention is to provide a novel timer control embodying means for controlling the duration of inflation of the boots to suit variations in the rate of icing and to suit variations in the type of ice encountered Thus under light icing conditions, the unit may be set for single cycle operation and the cycle initiated whenever the ice has built up to a thickness sufficient for good removal. If the icing condition is moderately severe the unit may be set for automatic operation with a variable time delay between cycles depending upon the severity of the icing condition. Further, in severe ice the unit may be set for automatic continuous operation with a predetermined set time delay between cycles.

For most icing conditions and particularly for slushy ice the rapidity of inflation is very important. With the older types of operating systems the inflation of the boots was sluggish and as a result the ice had time to mold itself to the changing contour of the boot surface. However, in the manifold-solenoid type of system such as disclosed in the aforenoted copending application of Donald M. Lawrence, David Gregg, and Myron L. Taylor, filed August 11, 1943, Serial No. 498,248, the pressure manifold acts as a reservoir so that when a given solenoid is energized a poppet type valve opens and releases a surge of pressure directly into the boot tubes which immediately expand to a full inflation. This type of operation is maintained without change throughout the variations of cycling time previously described, as it is the desired operation for most icing conditions regardless of the rate of icing.

For very hard types of ice, however, the completeness of the inflation and resulting distortion of the rubber surface become more important than the rapidity of change. Accordingly, it is an object of our invention to provide control means for increasing the inflation intervals by selected increments in order to assure complete inflation and to hold the boot in the completely inflated position momentarily. This assures the breaking of the ice by the holding of the rubber boot in the inflated position, so as to give time for the expansion of the boot to equalize, and assures the peeling off of the ice particles.

Furthermore, inasmuch as the low atmospheric pressure at high altitude cannot support a high water content, average icing conditions become less severe as such high altitudes are gained, and the ice formed is of a harder texture due to the low temperature encountered. Thus at high altitudes the rapidity of inflation of the boots is of less importance than the obtaining of full distortion.

Prior systems nevertheless call for the same rate of operation at all altitudes. Thus as air pump performance is reduced with an increase in altitude, it has heretofore been the practice of equipping an airplane with sufficient air pump capacity to provide the airflow necessary for standard boot operation at the required high altitude and thus a considerable excess capacity and weight of pump equipment would be provided over that required for operation at lower altitudes.

An object of our invention, however, is to provide control means whereby longer inflation intervals may be utilized by the boots at higher altitudes so as to compensate for the reduced output of the air pumps at such high altitudes and further so as to afford the more efficient operation of the boots under the icing conditions encountered at such high altitudes.

It is further an object of our invention to provide a novel system for controlling the operation of a boot in response to atmospheric pressure conditions.

Another object of our invention is to provide novel means whereby the frequency of inflations and the inflation period for the system may be varied in accordance with changes in altitude.

Another object of our invention is to provide a novel control system whereby the operation of an inflatable boot for the removal of ice may be varied in accordance with the actual rate of ice formation.

Another object of our invention is to provide a novel timer and control system.

Another object of our invention is to provide a novel control responsive to timed intervals and means responsive to atmospheric pressure for varying the period of said timed intervals.

Another object of our invention is to provide a novel control for an ice removal means responsive to actual icing conditions.

Another object of our invention is to provide a novel control for an ice removal means responsive to altitudte.

Another object of our invention is to provide a novel control system arranged to vary the interval of time between sequential operations in response to a first condition responsive means and said system so arranged as to vary the interval of time between cycles of said sequential operations in response to a second condition responsive means.

Another object of our invention is to provide a novel control for an ice removal means responsive to altitude and actual icing conditions.

A further object of our invention is to provide a novel electronic control for an ice removal means.

Other objects and advantages of this invention are set forth in the following description, taken with the accompanying drawings; and the novel features thereof are pointed out in the appended claims. The disclosure, however, is illustrative only and we may make changes in detail, especially in matters of shape, size, and arrangement of parts within the principle of the invention, to the full extent indicated by the broad and general meanings of the terms in which the appended claims are expressed.

In the accompanying drawings which form a part of this specification like characters of reference indicate like parts in the several views, wherein.

Figure 1:
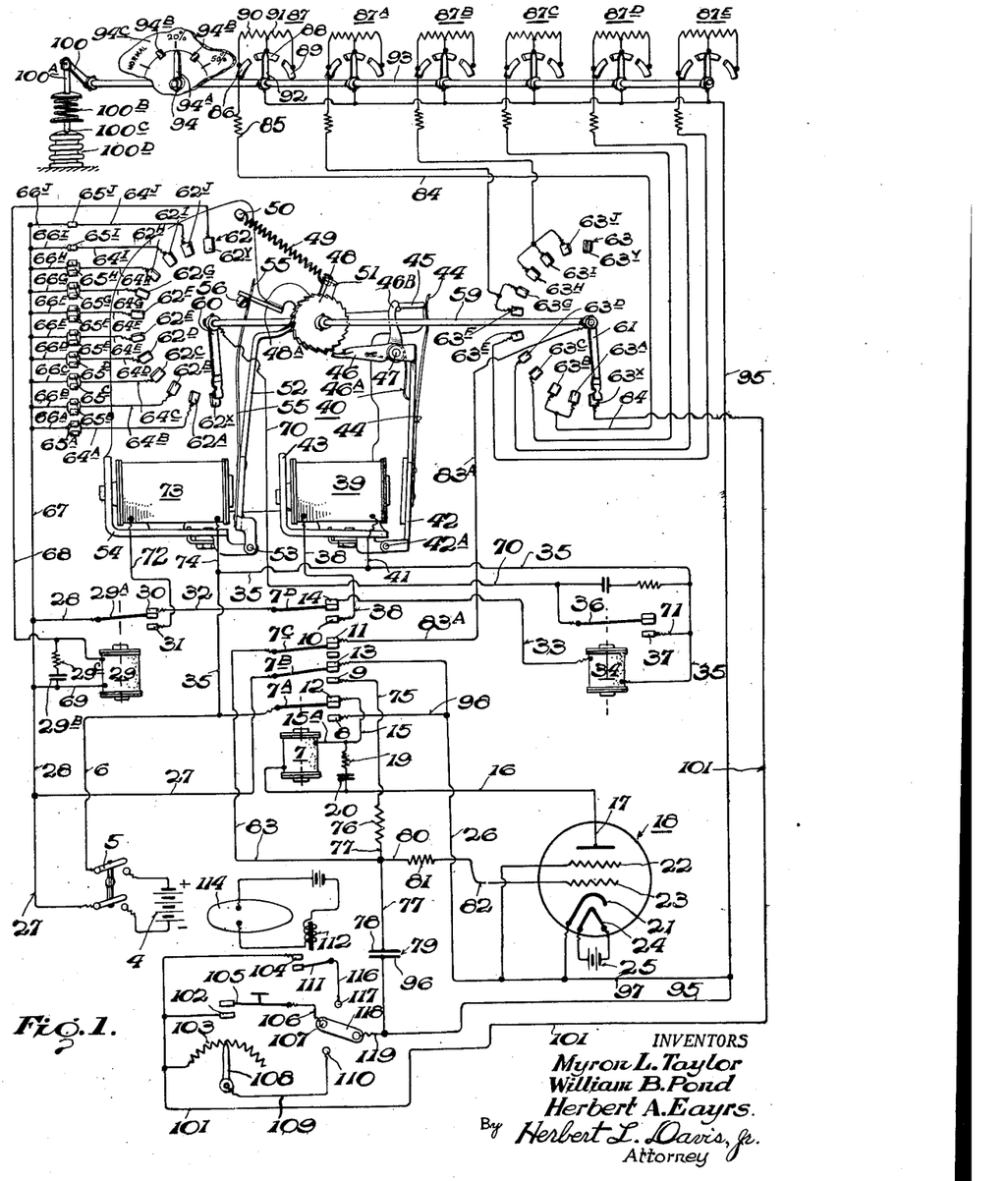
Figure 1 illustrates diagrammatically one form of our control system.

In the form of our invention illustrated in Figure 1, we have provided a suitable source of electrical current indicated by the numeral 4 which may be connected into our control circuit by closing a double pole switch 5. The positive terminal of the source of electrical energy 4 will then be connected by an electrical conductor 6 to a switch arm indicated by the numeral 7A.

A solenoid 7 controls the operation of the switch arm 7A and the operation of switch arms 7B, 7C, and 7D. Thus upon energization of the solenoid 7 the switch arms 7A, 7B, and 7D are actuated under the electromagnetic force of the solenoid 7 in such a manner as to close switch contacts 8, 9, and 10, respectively, while switch arm 7C is actuated so as to open switch contact 11. Upon de-energization of the solenoid 7 switch arms 7A, 7B, and 7D are biased under spring tension so as to open the switch contacts 8, 9, and 10 and close switch contacts 12, 13, and 14 respectively. Likewise upon such de-energization of the solenoid 7 switch arm 7C is biased under spring tension so as to close switch contact 11.

The switch contact 12 is connected by an electrical conductor 15 to one terminal of the solenoid 7 while the opposite terminal of the solenoid 7 is connected by a conductor 16 to a plate 17 of an electronic valve 18. Connected across the solenoid 7 to the conductors 15 and 16 is a resistance 19 connected in series with a condenser 20 for a purpose which will be explained.

The electronic valve 18 has further provided a cathode 21, shield grid 22, control grid 23, and heater or filament 24. The heater 24 is energized by a suitable source of electrical energy 25.

The cathode 21 and shield grid 22 are connected by an electrical conductor 26 to the contact 13 closed by the switch arm 7B upon de-energization of the magnet 7 as previously explained.

The switch arm 7B is connected upon closing of the switch 5 to the negative terminal of the source of electrical energy 4 by a conductor 27.

Figure 2:
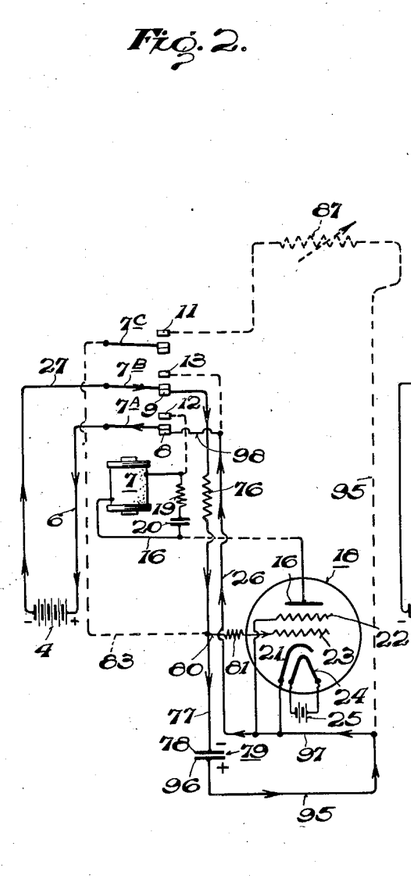
Figure 2 illustrates diagrammatically the charging circuit for the condenser 79 of our system illustrated in Figure 1.

It will thus be seen that upon first closing of the switch 5 and with the filament 24 energized through the source of electrical energy 25 that a flow of electronic energy will result from the negative terminal of the source of electrical energy 4 through the conductor 27, switch arm 7B, contact 13, conductor 26, cathode 21 across the electronic valve 18 to the plate 17, through the conductor 16, electromagnet 7, conductor 15, contact 12, switch arm 7A and returning through the conductor 6 to the positive terminal of the source of electromotive force 4. Such flow will cause the energization of the electromagnet 7 and will build up a charge in the condenser 20 so that upon the electromagnet 7 becoming sufficiently energized to cause the actuation of the arms 7A, 7B, 7C, and 7D into the opposite contact engaging relation a discharge of electrical energy from the condenser 20 will have a momentary energizing effect upon the electromagnet 7 so as to assure good contact in the latter shifted positions of the said switch arms, since the shifting of the arms 7A and 7B will momentarily break the circuit described between the electronic valve 18 and the source of electrical energy 4 as shown in Figure 2.

It will be further seen that there is connected to the conductor 27 and thus to the negative terminal of the source of electrical energy 4 a conductor 28 which leads to a switch arm 29A, the operation of which is controlled by an electromagnet 29. Upon de-energization of the electromagnet 29 the switch arm 29A is biased under spring tension into a contact closing relation with a switch contact 30, while on energization of the electromagnet 29 the switch arm 29A is adapted to be actuated by the electromagnet 29 so as to open the switch contact 30 and close a switch contact 31. A conductor 32 leads from the contact 30 to the switch arm 7D which upon the electromagnet 7 being deenergized is biased under spring tension into engaging relation with the contact 14. The contact 14 is connected by a conductor 33 to one terminal of an electromagnet 34, which is connected at the opposite terminal by a conductor 35 to the electrical conductor 6 which as previously described leads to the positive terminal of the source of electrical energy 4.

It will thus be seen that with the switch 5 in closed position and electromagnets 29 and 7 de-energized, a flow of electronic energy will pass from the negative terminal of the source of electrical energy 4 through the conductor 27, conductor 28, switch arm 29A, switch contact 30, conductor 32, switch arm 7D, switch contact 14, conductor 33, electromagnet 34, conductor 35, conductor 6, and thus to the positive terminal of the source 4 causing the energization of the electromagnet 34. The electromagnet 34 controls the operation of a switch arm 36 which upon energization of the electromagnet 34 is adapted to close a switch contact 37, but which switch arm 36 upon de-energization of the electromagnet 34 is biased under spring tension into an open relation with the switch contact 37.

It will be further seen that leading from the contact 10 closed by the switch arm 7D upon energization of the electromagnet 7 is an electrical conductor 38 which is connected to one terminal of an electromagnet 39 of a step control relay indicated generally by the numeral 40. The electromagnet 39 is connected at the opposite terminal by a conductor 41 to the conductor 35 and thereby through the conductor 6 to the positive terminal of the source of electrical energy 4. Thus it will be seen that upon energization of the electromagnet 7 so as to cause switch arm 7D to close contact 10 and electromagnet 29 being de-energized so as to cause switch arm 29A to close contact 30 that a flow of electronic energy will pass from the negative terminal of the source 4 through the conductor 27, conductor 28, switch switch arm 29A, contact 30, conductor 32, switch arm 7D, contact 10, conductor 38, electromagnet 39, conductor 41, conductor 35, conductor 6 and thereby to the positive terminal of the source 4 causing the energization of the electromagnet 39.

Energization of the electromagnet 39 causes the actuation of the step relay device 40 which may be of any of the numerous types well known in the art, but which as shown here for illustrating our control system includes an actuating arm 42 pivoted at one end on a pin 42A mounted on a base member 43. A leaf spring 44 is fastened at one end to the arm 42 and engages at the opposite end a fixedly mounted projecting arm 45 so as to exert a force upon the arm 42 biasing the arm 42 in a clockwise direction about the pivot 42A as shown in Figure 1.

A pawl 46 is pivoted on a pin 47 mounted at the free end of the arm 42. A light spring 46A biases the pawl 46 in a limited clockwise direction about the pin 47 so that upon counter-clockwise movement of the arm 42 the free end of the pawl 46 will move into engaging relation with a ratchet gear 48. A member 46B projects from the pawl 46 and is arranged to engage the fixed arm 45 so that upon clockwise movement of the arm 42 the pawl 46 may be actuated in a counter-clockwise direction against the biasing force of the light spring 46A out of engagement with the ratchet gear 48.

The electromagnet 39 upon energization is arranged for actuating the arm 42 in a counter-clockwise direction against the biasing force of the leaf spring 44 so as to cause the pawl 46 to engage the ratchet gear 48 and impart thereto an increment of clockwise movement against the biasing force of a spring 49 fastened at one end to a pin 50 and at the opposite end to an arm 51 provided on the ratchet gear 48. A latch arm 52 is pivoted at one end on a pin 53 mounted on the base member 54 and is positioned at the opposite end in engaging relation with the ratchet gear 48 so as to releasably lock the ratchet gear 48 from moving in a counter-clockwise direction under the biasing force of the spring 49.

A leaf spring 55 is mounted at one end on the latch arm 52 and engages at the other end a fixedly mounted pin 56 in such a manner as to bias the latch arm 52 in a clockwise direction into engaging relation with the ratchet gear 48. Counter-clockwise movement of the latch arm 52 against the biasing force of the leaf spring 55 would of course cause the release of the ratchet gear 48 for counter-clockwise movement under the biasing force of the spring 49. The extent of such counter-clockwise movement of the ratchet gear 48 is limited by an arm 48A mounted on the ratchet gear 48 for engagement of the pin 56 at the extreme counter-clockwise position of the gear 48.

The ratchet gear 48 is mechanically connected by an axle 59 or other suitable means to switch arms 60 and 61 in such a manner that each increment of movement of ratchet gear 48 in a clockwise direction upon energization of the electromagnet 39 will cause a corresponding movement of the switch arms 60 and 61 into successive engagement with the contacts of banks 62 and 63 respectively. Suitable means are provided for electrically insulating the switch arm 60 from the switch arm 61.

Figures 4, 5:
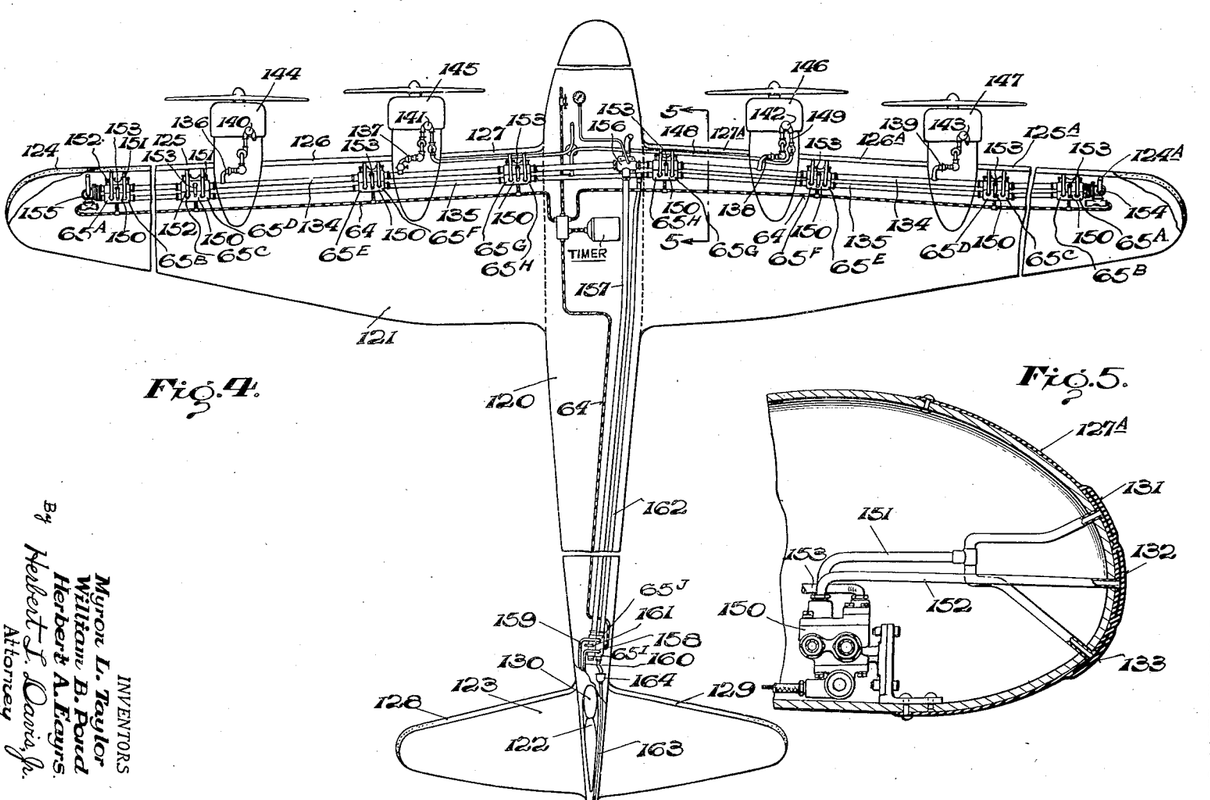
Figure 4 illustrates diagrammatically our control system as applied to a system for the removal of ice from an aircraft.
Figure 5 is a cross-sectional view taken along the line 5—5 of Figure 4 and looking in the direction of the arrows.

The contacts of bank 62 indicated as 62A, 62B, 62C, 62D, 62E, 62F, 62G, 62H, 62I, and 62J are connected respectively by conductors 64A, 64B, 64C, 64D, 64E, 64F, 64G, 64H, 64I, and 64J to one terminal of solenoids 65A, 65B, 65C, 65D, 65E, 65F, 65G, 65H, 65I, and 65J. Each of the said solenoids are arranged for controlling a boot valve as shown in Figure 4 so that upon energization of such valve controlling solenoid, expansion of a de-icer boot will result, while upon de-energization of the valve controlling solenoid the de-icer boot controlled thereby will be contracted as explained in the copending application of Donald M. Lawrence, David Gregg, and Myron L. Taylor, Serial No. 498,248, filed August 11, 1943. The opposite terminal of the boot valve controlling solenoids 65A, 65B, 65C, 65D, 65E, 65F, 65G, 65H, 65I, and 65J are connected by corresponding conductors 66A, 66B, 66C, 66D, 66E, 66F, 66G, 66H, 66I, and 66J to a conductor 67 leading to the conductor 28.

It will be further noted that a contact 62X positioned at one extreme end of the bank of contacts 62 is open and has no connection leading therefrom while a contact 62Y positioned at the opposite extreme end of the bank of contacts 62 is connected by a conductor 68 to one terminal of the electromagnet 29 while the opposite terminal of the electromagnet 29 is connected by a conductor 69 to the conductor 28. A condenser 29B and resistance element 29C are connected in series across the electromagnet 29 through the conductors 68 and 69 for a purpose which will be explained hereinafter.

The switch arm 60 is further connected by a conductor 70 to the switch arm 36 arranged to close switch contact 37 upon energization of the electromagnet 34. A conductor 71 leads from the switch contact 37 to the conductor 35 so that upon the switch arm 60 being adjusted so as to close for illustration contact 62A and upon electromagnet 34 being energized through the circuit previously described so as to cause switch arm 36 to close contact 37 a flow of electronic energy will pass from the negative terminal of the source 4 through conductor 27, conductor 28, conductor 67, conductor 66A, solenoid 65A, conductor 64A, switch contact 62A, switch arm 60, conductor 70, switch arm 36, switch contact 37, conductor 71, conductor 35, conductor 6, and returning to the positive terminal of the source 4. Similar circuits will be made upon the arm 60 engaging the contacts 62B, 62C, 62D, 62E, 62F, 62G, 62H, 62I, and 62J for energizing the respective valve controlling solenoids operated thereby.

However, upon the arm 60 reaching the extreme end contact 62Y instead of one of the said boot valve control solenoids being energized, the flow of electronic energy will pass from the arm 60 through the contact 62Y, conductor 68, electromagnet 29, conductor 69, conductor 28, conductor 27, and thus returning to the negative terminal of the source 4 energizing the electromagnet 29 and charging the condenser 29B. Thus upon the arm 60 closing switch contact 62Y and with contact 37 closed by switch arm 36, energization of the electromagnet 29 will result causing switch arm 29A to open contact 30 and close contact 31. It will be noted, however, that upon switch arm 29A opening contact 30 the electromagnet 34 would become de-energized causing switch arm 36 to open contact 37, whereupon the charge upon the condenser 29B, previously noted, would momentarily cause the energization of the electromagnet 29 sufficiently to assure good switch closing contact between switch arm 29A and contact 31. Switch contact 31 is connected by a conductor 72 to one terminal of an electromagnet 73. The opposite terminal of the electromagnet 73 is connected by a conductor 74 to the conductor 35. Thus it will be seen upon switch arm 60 closing contact 62Y causing through the energization of electromagnet 29 the switch arm 29A to close contact 31 that a flow of electronic energy will pass from the negative terminal of the source 4 through the conductor 27, conductor 28, switch arm 29A, contact 31, conductor 72, electromagnet 73, conductor 74, conductor 35, and conductor 6, so as to return to the positive terminal of the source 4 and cause energization of electromagnet 73.

Such energization of the electromagnet 73 will cause the actuation of the arm 52, under the electromagnetic force thereof, in a counter-clockwise direction about the pivot 53, whereupon the latch arm 52 will release the ratchet gear 48 which under the biasing force of the spring 49 will be turned in a counter-clockwise direction from its extreme clockwise actuated position to the position shown in Figure 1 causing thereby switch arm 60 to move from contact 62Y to the open contact 62X whereupon the circuit aforesaid would be broken.

It will be further noted that upon energization of electromagnet 7 on the firing of the electronic valve 18 as first described, the switch arm 7B will be actuated to a position closing the switch contact 9. The switch contact 9 is connected by a conductor 75 to one terminal of a resistance element 76. The opposite terminal of the resistance element 76 is connected by a conductor 77 to a plate 78 of a condenser indicated generally by the numeral 79. There is further connected to the conductor 77 a conductor 80 leading to a resistance element 81 which has the opposite end thereof connected to the control grid 23 through a conductor 82.

It will also be noted that the conductor 77 is connected by an electrical conductor 83 to the switch arm 7C which upon the electromagnet being de-energized is biased under spring tension so as to close contact 11. The contact 11 is connected by a conductor 83A to the switch arm 61 which as previously noted is arranged to engage the bank of contacts 63. Contacts 63X and 63Y are positioned at the extreme ends of the bank of contacts 63 and correspond in position to contacts 62X and 62Y, respectively, previously described. Contacts 63A, 63B, 63C, 63D, 63E, 63F, 63G, 63H and 63I correspond in position to the contacts 62A, 62B, 62C, 62D, 62E, 62F, 62G, 62H, and 62I, respectively, and the former bank of contacts 63 are arranged upon closure by the switch arm 61 to cause the energization of suitable electronic circuits for controlling the time period of energization of the solenoids controlled by the corresponding contacts 62A, 62B, 62C, 62D, 62E, 62F, 62G, 62H, 62I, and 62J of the switch arm 60.

In the illustration of Figure 1, contacts 63A and 63B are connected by a conductor 84 to one terminal of a resistance element 85. The opposite terminal of the resistance element 85 is connected to a contact 86 of an adjustable control 87 for varying the interval of boot inflation as will be explained. The control 87 has further provided contacts 88 and 89. Connected between the contacts 86 and 88 is a resistance element 90 and further connected between the contacts 88 and 89 is a resistance element 91. A switch arm 92 is provided for selectively closing the contacts 86, 88, and 89 so that the resistances 90 and 91 may be put in and out of the circuit as desired. Similar connections are made between the remaining contacts 63C through 63J and time controlling means 87A, 87B, 87C, 87D, and 87E which are essentially the same in operation to control 87 but which are preferably constructed so as to provide different resistance values so that each time interval provided may be in accordance with the requirements of the corresponding boot controlled through arm 60.

It is not deemed necessary therefore, to go into a detailed explanation of each time controlling means. Further, while the said time controlling means may be arranged for separate adjustment, for convenience in operation the switch arms 87, 87A, 87B, 87C, 87D, and 87E have been mounted on a single rotatable adjustment shaft 93. A knob 94 is operably connected through a suitable mechanical gear means and shaft not shown to the shaft 93. The shaft 93 may be conveniently adjusted through the knob 94, which may be mounted on a control panel 94C for manual operation. The knob 94 has a suitable slidable mechanical connection with its shaft, not shown whereby the knob 94 may be adjusted axially thereon.

The control knob 94 has connected thereto a spring arm 94A which may be conveniently arranged to partially engage detent portions 94B upon rotation of the knob 94 so that movement of the switch arm 92 between the contacts 86, 88, and 89 and the corresponding movement of the switch arms of the control means 87A, 87B, 87C, 87D, and 87E will be accompanied by a snap action so as to selectively change the resistance elements provided in the respective control means. The spring arm 94A is further adapted to fully engage the detents 94B so as to prevent adjustment of the said switch arms between their respective contacts upon inward axial movement of the knob 94 causing a corresponding movement of the spring arm 94A so as to fully engage said detent portions.

There is further connected to the shaft 93 a rocker arm 100 which is connected by a link member 100A to one end of a spring 100B. The opposite end of the spring 100B is connected by a link 100C to an aneroid 100D of conventional structure and responsive to atmospheric pressure so as to indicate changes in altitude.

From the foregoing it will be seen that with knob 94 adjusted axially outward so that the spring arm 94A will but slightly contact the detents 94B on rotary movement of the shaft 93, that upon a decrease in atmospheric pressure, as upon a rise in altitude, the aneroid 100D will expand, which movement will be converted through the spring 100B to the arm 100 causing the clockwise movement of the spring arm 94A. On a sufficient decrease in atmospheric pressure, the spring arm 94A will snap past the detent 94B causing movement of switch arm 92 and the switch arms connected thereto through shaft 93 to the third contact position corresponding to contact 89. An increase in atmospheric pressure as upon a decrease in altitude will cause an opposite counter-clockwise movement of the arm 94A and the switch arms aforesaid.

Other altitude determining means such as a sonic altimeter, may be employed to effect the latter automatic adjustment without departing from the scope of our invention as defined by the appended claims. Likewise a greater or lesser number of the control elements may be employed as desired.

Should it be desired to adjust the respective time controls manually this may be done by adjusting the knob 94 and then locking the same in the adjusted position by the inward axial movement of the knob 94 so that spring arm 94A will fully engage the detents 94B.

As shown in Figure 1 the respective switch arms of the adjustable controls 87, 87A, 87B, 87C, 87D, and 87E are connected by a common conductor 95 to a plate 96 of the condenser 79 arranged in opposite relation to the plate 78 previously described. Further the conductor 95 is connected by a conductor 97 to the cathode 21 of the electronic valve 18.

It will also be noted that upon energization of the electromagnet 7 the switch arm 7A will be actuated to a position closing the switch contact 8. The switch contact 8 is connected by a conductor 98 to the conductor 26.

From the foregoing it will be seen that upon the adjustment of the switch arm 61 so as to close contact 63A and with the electromagnet 7 energized the arms 7A and 7B will be actuated so as to open the contacts 12 and 13 and close the contacts 8 and 9, respectively, while the switch arm 7C will open the contact 11. In the latter position the condenser 79 will be charged by the electromotive force derived from the source of electronic energy 4 flowing from the negative terminal thereof through the conductor 27, switch arm 7B, contact 9, conductor 75, resistance 76, conductor 77 to the plate 78 of the condenser 79 so as to give a negative potential thereto, while a flow of electrons from the plate 96 will give a positive potential thereto. The latter electronic flow will pass through the conductor 95, conductor 97, conductor 26, conductor 98, contact 8, switch arm 7A, conductor 6, and then to the positive terminal of the source of electrical energy 4 as in Figure 2. Such charging operation will as shown in Figure 2 place also a negative potential upon the control grid 23, while the cathode 21 will be positively charged in relation thereto so as to restrain the firing action of the valve 18.

Figure 3:
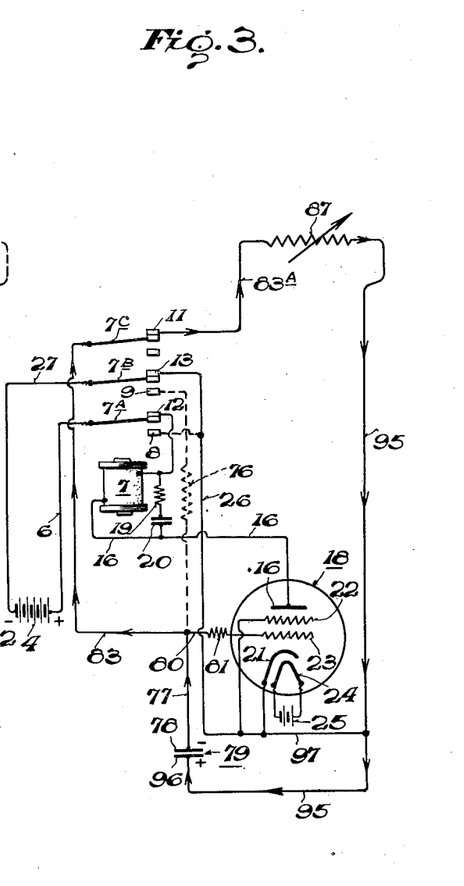
Figure 3 illustrates diagrammatically the discharging circuit for the condenser 79 of our system illustrated in Figure 1.

Upon the de-energization of the electromagnet 7 the switch arms 7A, 7B, and 7C will be biased under spring tension so as to close contacts 12, 13, and 14 respectively, whereupon an electronic discharge will flow from the negatively charged plate 78 of the condenser 79 through the conductor 77, conductor 83, switch arm 61, contact 63A, conductor 84, resistor 85, resistor 89, contact 88, switch arm 92, conductor 95, to the positively charged plate 96 of the condenser 79. Further the negative charge of the plate 78 acting through conductor 77, conductor 80, resistor 81, and conductor 82 will place a negative charge upon the control grid 23 and the positive charge on plate 96 acting through the conductor 95 and conductor 97 will place a positive charge in relation thereto on the cathode 21 as shown in Figure 3.

This charge on the condenser 79 will gradually leak off over the resistance provided through the time controlling means 87 until the potential of the control grid 23 has reached the firing point of the electronic valve 18 at which time the valve fires, completing as previously described a circuit to its plate relay 7. The various time intervals between the firing of the valve 18 may be conveniently regulated by varying the resistances at the time controlling means 87, 87A, 87B, 87C, 87D, and 87E, respectively.

It will be noted that upon the switch arm 61 reaching the contact 63Y, an open contact, no such timing circuit would be completed, but upon the switch arm 61 being returned through the biasing force of the spring 49 so as to close the contact 63X further control means may be placed in operation for determining the interval between cycles of operation.

Thus while the contact 63Y is an open contact, the contact 63X is connected by a conductor 101 to a switch contact 102, a rheostat resistance element 103, and a second switch contact indicated generally by the numeral 104. The switch contact 102 may be conveniently closed by a switch 105 preferably of the push button type. The switch arm 105 is in turn connected by a conductor 106 to a switch contact 107.

The rheostat resistance element 103 previously noted is connected parallel to the switch 105. There is provided on the resistance element 103 an adjustable arm 108 whereby the resistance element 103 may be manually adjusted so as to vary the resistance thereof. A conductor 109 connects the arm 108 to a second switch contact 110.

The switch contact 104 may be automatically closed by a switch arm 111 upon energization of the electromagnet 112. The energization of the electromagnet 112 is controlled by an ice formation detection means 114 which may be of any suitable type such as the type shown for example in the Patent No. 2,159,186 to Kingdon S. Tyler dated May 23, 1939, and owned by the assignee of the present application or preferably an ice thickness detection means such as shown in the copending application of William B. Pond, Serial No. 498,247, filed August 11, 1943, and owned by the assignee of the present application. In the said ice formation detection means there is provided means whereby a periodic determination of the rate of ice formation may be ascertained. The ice detection means used herein is so adjusted as to furnish such a measurement immediately after the termination of each cycle of operation of the inflatable ice eliminating system and is further so adjusted as to cause the energization of the electromagnet 112 after a time interval and rate of ice formation that would cause an accumulation on the wings of the plane of a sheet of ice of approximately one eighth of an inch in thickness. Such energization of the electromagnet 112 will cause the switch arm 111 to close contact 104. The switch arm 111 as shown in Figure 1 is connected by a conductor 116 to a third contact 117.

A switch arm 118 is arranged to selectively close the contacts 107, 110, and 117. A conductor 119 leads from the switch arm 118 to the conductor 95.

It will be readily apparent that upon the arm 61 returning to the contact 63X and the switch 118 being adjusted so as to close the contact 107, as for manual operation between cycles, that the cycle of operation of the control will not restart since the leak resistance circuit would be open and thus a negative charge would be placed on the control grid 23 for an indefinite duration limited only by the inherent leakage of the condenser itself and thus prevent the refiring of the electronic valve 18 for such period. However, upon manually actuating the switch 105 so as to close contact 102 the condenser 79 would be shorted and immediately discharged so that the firing of the electronic valve 18 may be immediately facilitated. Thus each cycle of operation may be manually initiated when desired by the operator.

Further if it be desired that each cycle of operation be automatically continued after a predetermined delay period this may be accomplished by manually adjusting the switch arm 118 so as to close contact 110 whereupon the resistance element 103 would then serve as a resistance leak for the condenser 79 in the same manner as the resistance elements of the time controlling means 87. The time interval determined by the resistance element 103 may be conveniently varied by adjusting the resistance of the element 103 through operation of the manually adjustable arm 108.

Further upon the switch 118 being adjusted so as to close the third contact 117 it will be seen that so long as the rate of ice formation does not equal the critical value for which the ice formation detecting means is adjusted, an ice formation of approximately one-eighth of an inch for example, the circuit controlled by the switch arm 111 will not be closed but when the ice reaches the predetermined critical condition the electromagnet 112 will be energized through the operation of the ice detection means 114 causing the switch arm 111 to close contact 104 so that the charged condenser 79 becomes shorted causing its immediate discharge so that firing of the electronic valve 18 will result and the cycle of operation of the system once again initiated. It will thus be seen that we have provided novel means for initiating the operation of the inflatable ice eliminating system in response to actual icing conditions.

With the control system first in the position shown in Figure 1 the operation of the system is as follows:

The filament 24 is first heated and then the switch 5 is closed whereupon the electronic valve 18 immediately fires causing through the action of its plate circuit previously described the energization of the electromagnet 7, and the charging of the condenser 20. The energization of the electromagnet 7 will cause the closure of the contact 10 by the switch arm 7D whereupon the electromagnet 39 of the step relay 40 will be energized causing the actuating arm 42 to be moved in a counter-clockwise direction so that the pawl 46 engages and rotates the ratchet gear 48 in a clockwise direction against the biasing force of the spring 49, moving the arm 60 from contact 62X to 62A and then arm 61 from contact 63X to 63A.

Furthermore, the energization of the electromagnet 7 will cause switch arm 7A to open contact 12 terminating the firing action of the tube 18 and thereby open the plate energizing circuit of the electromagnet 7 which electromagnet, however, will continue to be energized momentarily through the discharge action of the condenser 20 through resistance 19 and electromagnet 7 as previously described. Also switch arm 7B will open contact 13 and switch arm 7C will open contact 11. Switch arms 7A and 7B, however, will close contacts 8 and 9 causing as previously described and shown in Figure 2 the charging of condenser 79 so that condenser plate 78 acquires a negative charge and condenser plate 96 is positively charged and placing a negative charge upon the control grid 23 and positive charge on the cathode 21 so as to restrain the firing action of the tube 18.

Now upon the discharge action of the condenser 20 terminating, the electromagnet 7 becomes de-energized permitting switch arm 7D to open contact 10 whereupon the electromagnet 39 is de-energized and the actuating arm 42 biased in a clockwise direction under the force of the leaf spring 44. Such action of the arm 42 causes the pawl 46 to be moved into a disengaging position from the ratchet gear 48. The ratchet gear 48, however, is locked in the aforenoted adjusted position by the latch arm 52 biased in a clockwise direction into engaging position with the ratchet gear 48 so as to prevent counter-clockwise movement of the ratchet gear 48 under the biasing force of spring 49.

Further the switch arm 7D upon de-energization of the electromagnet 7 closes the switch contact 14 which causes the energization of the electromagnet 34 so that the switch arm 36 closes contact 37 whereupon a circuit is closed through the switch arm 60 which as previously described has closed contact 62A causing the energization of the boot valve control solenoid 65A.

Upon energization of the boot valve control solenoid 65A the inflatable tubes or boots controlled thereby are inflated with air for a time interval terminated upon the breaking of the circuit controlling the boot valve control solenoid 65A.

Similarly upon the de-energization of the solenoid 7 the switch arms 7A and 7B open contacts 8 and 9 and thereby terminate the charging of the condenser 79. The switch arms 7A, 7B, and 7C further close contacts 12, 13, and 11, respectively, initiating the discharging operation of the charged condenser 79 as shown in Figure 3 whereupon the condenser 79 continues to apply a negative charge upon the control grid 23 and positive charge upon the cathode 21 until the discharge action of the condenser 79 from the negatively charged condenser plate 78 through the switch arm 7C, contact 11, switch arm 61, contact 63A, resistance of time control means 87 to the positively charged condenser plate 96 has been sufficient to decrease the potential of the control grid 23 to a point where the electronic valve 18 may once again fire. The interval of time of such delay in the firing of the electronic valve 18 will be dependent upon the resistance value within the time control means 87 which may be varied as will be further described hereinafter.

Upon the electronic valve 18 firing once again the electromagnet 7 is energized causing the switch arm 7D to open contact 14 and thereby de-energizing the electromagnet 34 whereupon switch arm 36 opens contact 37 breaking the circuit energizing the boot valve control solenoid 65A whereupon the inflated tubes or boots controlled thereby are deflated.

Furthermore, upon such energization of the electromagnet 7 the switch arm 7D is actuated so as to close contact 10 causing energization of the electromagnet 39 so as to move the switch arm 60 from contact 62A to contact 62B for controlling the energization of the boot valve solenoid 65B and so as to move the switch arm 61 to contact 63B for controlling the time interval of the inflation of the tubes or boots controlled by the boot valve solenoid 65B.

Furthermore, the switch arms 7B and 7C are actuated by the said energized electromagnet 7 so as to open contacts 13 and 11 terminating the condenser 79 discharging period of operation and the switch arms 7A and 7B are further actuated so as to close contacts 8 and 9, respectively, so as to initiate once again the condenser 79 charging period of operation as previously described and shown in Figure 2.

The operation of the control system will then be repeated until the electromagnet 39 is energized upon the switch arm 7D closing contact 10 immediately following the charging period of the condenser 79 so as to cause movement of the switch arm 60 from contact 62J to 62Y and switch arm 61 from 63J to 63Y whereupon on the electromagnet 7 becoming de-energized as previously explained the switch arm 7D will open contact 10 de-energizing the electromagnet 39 and causing the actuating pawl 46 to be moved out of engaging relation with the ratchet gear 48 as previously described.

Further, upon the electromagnet 7 becoming de-energized switch arm 7D will close contact 14 energizing electromagnet 34 and causing the switch arm 36 to close contact 37 which would then complete a circuit through the switch arm 60 and 62Y to electromagnet 29 energizing the electromagnet 29 and charging the condenser 29B.

The electromagnet 29 thus becoming energized would actuate the switch arm 29A so as to open contact 30 and thus de-energize the electromagnet 34 whereupon the switch arm 36 would open contact 37 controlling the circuit to the electromagnet 29. However, upon the energization of the electromagnet 29, the condenser 29B is sufficiently charged so that upon the opening of the previous circuit to the electromagnet 29 an electronic discharge from the condenser 29B will energize the electromagnet momentarily to assure the movement of the switch arm 29A into contact closing relation with the contact 31. The closing of contact 31 will then cause the energization of the electromagnet 73 whereupon the arm 52 is moved in a counter-clockwise direction out of engaging relation with the ratchet gear 48 permitting the counter-clockwise movement of the ratchet gear 48 under the biasing force of the spring 51 and the corresponding return movement of the switch arms 60 and 61 from engaging relation with contacts 62Y and 63Y, respectively, into engaging relation with contacts 62X and 63X, respectively.

As previously explained with the switch 118 closing contact 107 the discharge circuit for the condenser 79 would remain open until the push button 105 closes contact 102, discharging the condenser 79, and permitting the electronic valve 18 to fire whereupon the cycle of operation would then be repeated.

This is likewise true if the contact 117 is closed by the switch 118 in which case the condenser 79 discharge circuit would remain open until the accumulation of ice as measured by the ice detection means 114 is sufficient to cause the energization of electromagnet 112 closing the circuit controlled by the switch arm 111 whereupon the condenser 79 would be immediately discharged permitting the firing of the electronic valve 18 and the repetition of the cycle of operation.

However, if the contact 110 is closed by the switch arm 118 the discharge circuit of the condenser 79 would be closed through the resistance 103 which would determine the delay period or time interval between cycles of operation of the inflatable ice eliminating system. The greater the resistance in such circuit as adjusted through the arm 108 the greater the delay period.

It will be further seen by increasing the resistance in the timing control means of 87, 87A, 87B, 87C, 87D, and 87E, the greater the period of delay or time interval of the inflation of the respective boots determined thereby. Similarly by decreasing such resistance this period of delay may be decreased.

Since as previously explained it is desirable to increase the period of inflation of the boots at the higher altitude it will be noticed that such result is automatically accomplished in the disclosure of Figure 1 wherein an aneroid is provided to automatically adjust the timing control means so as to increase the period of inflation with increase in altitude and decrease such period with decrease in altitude. In the disclosure of Figure 1 there is further provided manual means for making this adjustment. Through the means provided a proportionate increase of the time interval of inflation for each boot may be made. Thus for example, the control contacts corresponding to the contact 86 may have resistance elements provided whereby a normal cycle would be accomplished, while the control contacts corresponding to the contact 88 if closed by switch arms corresponding to 92 might provide a 20% increase in the time interval of inflation for all boots, while the contacts corresponding to contact 89 if closed might provide a 50% increase in the time of inflation for all boots. Such time intervals may be varied as may be found desirable.

Furthermore, it is to be understood that while we have provided means for placing in the timing control circuits different resistance values, the same result may be accomplished by retaining the resistances at a constant value and varying the capacity of the condenser or if desired the resistances may be varied and the capacity of the condenser may be varied, without departing from the scope of our invention as defined by the appended claims.

In Figure 4 our control system is illustrated as applied to a system for the removal of ice such as described in the copending application of Donald M. Lawrence, David Gregg, and Myron L. Taylor, Serial No. 498,248, filed August 11, 1943, and in the application of Myron L. Taylor and Samuel K. Lehman, Serial No. 498,249, filed August 11, 1943, now U. S. Patent No 2,405,362, granted August 6, 1946.

In the disclosure of Figure 4 to which our novel control system may be applied there is shown an airplane comprising a fuselage 120 having forward wings 121 and rear vertical and horizontal stabilizers 122 and 123 respectively.

A plurality of expandable boot units of the type disclosed in the aforenoted Patent No. 1,990,866 to David Gregg are mounted at the leading edge of the forward wings 121. These expandable units are indicated on the forward port wing by the numerals 124, 125, 126, and 127, while on the starboard wing corresponding expandable units are indicated by numerals 124A, 125A, 126A, and 127A. Expandable units are further provided at the leading edge of the rear horizontal stabilizers indicated at the port side by the numeral 128 and at the starboard side by the numeral 129. A further expandable unit 130 is provided at the leading edge of the vertical stabilizer 122 as shown in Figure 4.

Each of the said expandable units are constructed of elastic rubber-like material suitably reinforced and secured upon the wing or other airfoil and each unit comprises one or more inflatable tubes. For simplicity of illustration each boot is shown as comprising three tubes for inflation, indicated in Figure 5 by the numerals 131, 132, and 133. The tubes 131 and 133 are arranged for inflation and deflation together, while the tube 132 is separately inflatable from the tubes 131 and 132.

Extending spanwise of the forward wings 121 are main air pressure and suction conduits indicated by numerals 134 and 135, respectively. The air pressure conduit 134 is connected by conduits 136, 137, 138, and 139 to suitable air pressure pumps 140, 141, 142, and 143 driven by the airplane motors 144, 145, 146, and 147, respectively. The suction conduit 135 is connected by a conduit 148 to a suction conduit 149 leading from the pump 142.

As shown in Figure 4 separate distributor valve units 150 are provided for independently controlling the expansion and contraction of the aforesaid units. The said distributor valves 150 are connected directly into the main pressure and suction lines 134 and 135, respectively, as shown in Figure 4 and control the inflation and deflation of the inflatable tubes 131 and 133 through a conduit 151 while the tube 132 is controlled through a conduit 152. The exhaust pressure from the said tubes 131, 132, and 133 is conducted outward through the exhaust or overboard conduit 153 during deflation of the tubes 131, 132, and 133.

Provided at the opposite ends of the spanwise extending conduits 134 and 135 are manifold unloading valves 154 and 155 for releasing the pressure within the line 134 when the inflatable boats are not in use. The manifold unloading valves are preferably of the type described in the application of Myron L. Taylor and Samuel K Lehman, Serial No. 498,249, filed August 11, 1943, now U. S. Patent No. 2,405,362, granted August 6, 1946, and owned by the assignee of the present application. The valves 154 and 155 may be controlled electrically by the switch 5 through suitable electrical connections not shown, or a separate control switch may be provided therefor.

A suitable relief valve 156 is mounted intermediate the opposite ends of the spanwise extending pressure conduit 134 for relieving the pressure within the conduit 134 upon the same increasing beyond a predetermined maximum value.

There is connected at the relief valve 156 a second pressure line 157 which extends longitudinally of the plane to a distributor valve 158 positioned at the rear of the plane. The distributor valve 158 is arranged for controlling through the conduits 159 and 160 the inflation and deflation of tubes provided within the expandable units 128, 129, and 130, which correspond to the tubes 131, 132, and 133 previously described. The exhaust pressure from the tubes during deflation is conveyed outward through conduit 161.

A suction line 162 connects the said distributor valve 158 to the main suction line 135. A second suction line 163 extends from the distributor valve 158 to the low pressure area of the plane. A suitable control valve 164 regulates the line 163 so as to open the same upon a decrease in the suction force exerted at the line 162 below a predetermined minimum value so as to exert in such event an added suction force to the line 162.

The distributor valves 150 and 158 are controlled by a pair of solenoids mounted in each as explained in the aforenoted copending application of Donald M. Lawrence, David Gregg, and Myron L. Taylor, Serial No. 498,248, filed August 11, 1943. The distributor system shown in Figure 4 is symmetrical, in that the units mounted on the starboard side of the airplane follow the arrangement on the port side.

Moreover, as shown in Figure 1, the solenoids 65A, 65B, 65C, 65D, 65E, 65F, 65G, and 65H are provided in pairs. The solenoids of each pair are mounted at opposite sides of the airplane for operating correspondingly positioned units, as shown in Figure 4, and further the solenoids of each pair are arranged for joint energization, as shown diagrammatically in Figure 1. The solenoids 65I and 65J control the distributor valve 158. The solenoids 65A, 65B, 65C, 65D, 65E, 65F, 65G, 65H, 65I and 65J are controlled by the switch arm 60 and contacts 62 as previously explained.

As described in detail in the aforenoted application of Donald M. Lawrence, David Gregg, and Myron L. Taylor, Serial No. 498,248, filed August 11, 1943, the said solenoids are arranged so that upon energization thereof the boot tube or tubes controlled thereby will be inflated, while upon de-energization thereof the said boot tube or tubes will be deflated. As shown in Figure 4 a cable 64 carries the necessary electrical conductors for controlling the energization of the respective solenoids. The time interval of operation for each unit, and the time interval between cycles of operation, will of course be determined by our novel control system previously described.

While we have shown our control system as applied to a system for the removal of ice from an aircraft it will be readily understood that the same is not limited thereto.

Likewise while an electronic timer is illustrated and described as the timing means of our invention, other forms of timing means such as a thermal timer or spring clock timer may be used without departing from the scope of our invention as defined by the appended claims.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In an ice elimination system having a plurality of ice eliminating units automatically operable in predetermined cycles of operation, first adjustable means for varying a time interval for the operation of each unit, and second adjustable means for varying a time interval between the cycles of operation of said units so as to control the operation of said ice eliminating units in accordance with icing conditions.

2. In an ice elimination system having a plurality of ice eliminating units automatically operable in a predetermined cycle of operation, first condition responsive means for automatically varying a time interval for the operation of each unit and second condition responsive means for automatically varying a time interval between the cycles of operation of said units.

3. In an ice elimination system having a plurality of ice eliminating units automatically operable in a predetermined cycle of operation, altitude responsive means for automatically varying an interval of time for operation of each unit in accordance with ice forming conditions, and means responsive to a predetermined ice formation for automatically varying an interval of time between the cycles of operation of said units.

4. In an ice elimination system, a plurality of ice eliminating units automatically operable in a predetermined cycle of operation for determined time intervals, first timing means for controlling the interval of operation of each unit, second timing means for controlling a time interval between cycles of operation of said units, and means for adjusting one of said timing means independently of the other.

5. The method of removing ice from an aircraft surface having a plurality of inflatable tubes for distorting the leading edge of said surface, which comprises successively inflating and deflating said tubes in a predetermined sequence of operation, permitting in said sequence of operation a predetermined uniform interval of time to pass between the initiation of the deflation of an inflated tube and the initiation of the inflation of a deflated tube, and varying the period of inflation of said tubes in accordance with icing conditions without affecting the aforesaid predetermined uniform interval of time.

6. The combination with an airfoil surface, of means for removing ice therefrom operable for a predetermined period, means responsive to ice formations for automatically controlling the initiation of operation of said ice removing means, a timer for determining the period of operation of said ice removing means, and altitude responsive means for controlling said timer so as to vary the period of operation of said ice removing means in accordance with ice forming conditions.

7. A time delay circuit controlling apparatus comprising, an electronic valve for controlling said circuit, a variable timer for controlling the operation of said electronic valve, and means controlled by said electronic valve for affecting said variable timer so as to provide a sequence of predetermined periods of operation of different duration for said electronic valve.

8. A time delay circuit controlling apparatus comprising an electronic valve having an anode and cathode connected with said time delay circuit and a control grid, a capacitor connected between the grid and the cathode, electromagnetic means controlled by said time delay circuit for alternately charging and discharging said capacitor, said capacitor upon discharging supplying a bias to said grid for controlling the operation of said valve, means for retarding the discharge of said capacitor, whereby said control bias is supplied to said grid for the time of said delay and means for varying said retarding means, said last mentioned means controlled by said electromagnetic means.

9. A time delay circuit controlling apparatus comprising an electronic valve having an anode and cathode connected with said time delay circuit and a control grid, a capacitor connected between the grid and the cathode, electromagnetic means controlled by said time delay circuit for alternately charging and discharging said capacitor, said capacitor upon discharging supplying a negative bias to said grid, and a plurality of resistors for retarding the discharge of said capacitor whereby said negative bias is supplied to said grid for a predetermined time interval so as to restrain said electronic valve from closing said time delay circuit for a predetermined delay period means for selectively connecting said resistors into said time delay circuit, and said last mentioned means controlled by said electromagnetic means.

10. A time delay circuit controlling apparatus comprising an electronic valve having an anode and cathode connected with said time delay circuit and a control grid, a capacitor connected between the grid and the cathode, first means controlled by said time delay circuit for alternately charging and discharging said capacitor, said capacitor upon discharging supplying a negative bias to said grid for restraining said electronic valve from closing said time delay circuit, second means for retarding the discharge of said capacitor so as to supply said negative bias to said grid for a predetermined delay period, third means for varying said predetermined period for supplying said negative bias to said grid by said capacitor, and said third means controlled by said first means.

11. A time delay circuit controlling apparatus comprising an electronic valve having an anode and cathode connected in said time delay circuit and a control grid, a capacitor connected between the grid and the cathode, a relay connected into said time delay circuit and energized upon said valve closing said time delay circuit, a second circuit for charging said capacitor and a third circuit for discharging said capacitor, said relay arranged upon the energization thereof to open said time delay circuit and momentarily close said second circuit for charging said capacitor, and said relay arranged upon de-energization thereof following the opening of said time delay circuit to open said second circuit after said momentary charging period and close said third circuit for discharging said capacitor, said capacitor arranged upon discharging to supply a negative bias to said grid for restraining said electronic valve from closing said time delay circuit, a resistor in said third circuit for retarding the discharge of said capacitor whereby said capacitor continues to apply a negative bias to said grid for a predetermined delay period so as to restrain said electronic valve from closing said time delay circuit during said delay period.

12. A time delay circuit controlling apparatus comprising, an electronic valve having an anode and cathode connected in said time delay circuit and a control grid, a capacitor connected between the grid and the cathode, a relay connected into said time delay circuit and energized upon said valve closing said time delay circuit, a second circuit for charging said capacitor and a third circuit for discharging said capacitor, said relay arranged upon the energization thereof to open said time delay circuit and momentarily close said second circuit for charging said capacitor, and said relay arranged upon de-energization thereof following the opening of said time delay circuit to open said second circuit after said momentary charging period and close said third circuit for discharging said capacitor, said capacitor arranged upon discharging to supply a negative bias to said grid for restraining said electronic valve from closing said time delay circuit, variable resistance means in said third circuit for retarding the discharge of said capacitor so as to supply said negative bias to said grid for a predetermined delay period, and means controlled by said relay for varying said variable resistance means so as to vary said predetermined period for supplying said negative bias to said grid by said capacitor in accordance with a predetermined cycle of operation.

13. The method of removing ice from an aircraft surface having at least one inflatable tube for distorting the leading edge of said surface, which comprises cyclically inflating and deflating said tube for predetermined periods, increasing the period of inflation for said tube upon an increase in altitude and decreasing the period of inflation for said tube upon a decrease in altitude so as to maintain a predetermined relationship between the altitude of the aircraft surface and the period of inflation of the tube.

14. The method of removing ice from an aircraft surface having at least one inflatable tube for distorting the leading edge of said surface, which comprises cyclically inflating and deflating said tube for predetermined periods, decreasing the period of inflation for said tube upon a predetermined increase in atmospheric pressure, and increasing the period of inflation for said tube upon a predetermined decrease in atmospheric pressure so as to maintain a predetermined relationship between the prevailing atmospheric pressure and the period of inflation of the tube.

15. The method of removing ice from an aircraft surface having a plurality of inflatable tubes for distorting the leading edge of said surface and said tubes each inflatable for predetermined periods, which comprises successively inflating and deflating said tubes in a predetermined cycle of operation, varying the period of inflation for each of said tubes in accordance with altitude, and varying a period between said cycles of operation in accordance with actual icing conditions.

16. The combination with an airfoil surface, of means for removing ice therefrom, an electronic valve, a source of electrical energy, a capacitor, means controlled by said electronic valve for causing said source of electrical energy to periodically charge said capacitor, and said charged capacitor arranged for controlling said electronic valve for a predetermined time interval, and means controlled by said electronic valve for operating said ice removing means for said predetermined time interval.

17. The combination with an aircraft, of a plurality of inflatable units for removing ice from an airfoil surface, separate electromagnetic controls for each of said units, a time delay circuit, an electronic valve having an anode and cathode connected in said time delay circuit and a control grid, a capacitor connected between the grid and the cathode, a relay connected into said time delay circuit and energized upon said electronic valve closing said time delay circuit, a second circuit for charging said capacitor and a third circuit for discharging said capacitor, said relay arranged upon the energization thereof to open said time delay circuit and momentarily close said second circuit for charging said capacitor and said relay arranged upon de-energization thereof following the opening of said time delay circuit to open said second circuit after said momentary charging period and close said third circuit for discharging said capacitor, said capacitor arranged upon discharging to supply a negative bias to said grid for restraining said electronic valve from closing said time delay circuit, a plurality of variable resistors for separate connection into said third circuit, said variable resistors for retarding the discharge of said capacitor so as to supply said negative bias to said grid for a predetermined delay period, a fourth circuit closed by said relay upon the de-energization thereof, said electromagnetic controls arranged for separate connection into said fourth circuit, a motor means, a fifth circuit for periodically energizing said motor means, said fifth circuit closed upon the energization of said relay, and said motor means for sequentially connecting said variable resistors into said third circuit and said electromagnetic controls into said fourth circuit upon the periodic energization of said motor means, whereby said units are actuated in succession and each of said units actuated for a predetermined delay period, atmospheric pressure responsive means for adjusting said variable resistors so as to vary said predetermined delay period in accordance with ice forming conditions, means for terminating the actuation of said units upon the completion of a cycle of operation, ice formation responsive means for determining the period between cycles of operation, and manually controlled means for adjusting the predetermined period of actuation of said units.

18. A system for the removal of ice from an aircraft having a plurality of inflatable tubes on its leading edges and pump means for inflating and deflating said tubes, comprising, in combination, first means for controlling said pump means in such a manner as to successively inflate and deflate said tubes in a predetermined sequence of operation, second means for providing during said sequence of operation uniform periods between the initiation of the deflation of an inflated tube and the initiation of the inflation of a deflated tube, and third adjustable means for varying the inflation periods of said tubes in such a manner as to unaffect the said uniform periods between initiation of deflation and inflation of said tubes.

19. The combination with an airfoil surface, of means for removing ice therefrom, means operating said ice removing means in a cycle of operation during a predetermined period, condition responsive means for affecting said last mentioned means so as to vary the period of said cycle of operation of said ice removing means, manually adjustable means for varying the period of said cycle of operation of said ice removing means and said manually adjustable means arranged for placing said condition responsive means in and out of operative relation.

20. The combination with an airfoil surface, of means for removing ice therefrom and operable for a predetermined period, first manually operable means for initiating the operation of said ice removing means, first condition responsive means for varying the period of operation of said ice removing means, second manually adjustable means for varying the period of operation of said ice removing means and said second manually adjustable means arranged for placing said first condition responsive means in and out of operative relation, second condition responsive means for varying a period between operations of said ice removing means, and said first manually operable means arranged for initiating the operation of said ice removing means independently of said second condition responsive means.

21. The combination with an airfoil surface, of means for removing ice therefrom, first manually operable means for initiating operation of said ice removing means, first condition responsive means for varying a period of operation of said ice removing means, second manually adjustable means for varying a period of operation of said ice removing means and said second manually adjustable means arranged for placing said condition responsive means in and out of operative relation, and adjustable timing means for effecting a period between operations of said ice removing means.

22. The combination, comprising means for removing ice from an airfoil surface, an electronic valve for controlling said ice removing means, a variable time delay circuit means for controlling the operation of said electronic valve, and means controlled by said electronic valve for controlling said variable time delay circuit means so as to provide a sequence of predetermined periods of operation for said ice removing means.

23. The combination comprising an expansible member for the removal of ice from an airfoil surface of an aircraft, operating means to periodically expand said member, means for controlling said operating means including an altitude responsive means, said altitude responsive means being operatively connected to said operating means to effect a predetermined increase in the period of expansion of the member upon a given increase in altitude of said aircraft.

24. The combination comprising an expansible member for the removal of ice from an airfoil surface of an aircraft, operating means to periodically expand said member, means for controlling said operating means including an atmospheric pressure responsive means, said atmospheric pressure responsive means being operatively connected to said operating means to effect a predetermined increase in the period of expansion of the member upon a given decrease in atmospheric pressure.

25. For use to control expandable ice eliminating members on aircraft, the combination, comprising, a periodically operable timer, ice formation responsive means for initiating operation of said timer, independent altitude responsive means, and means operatively connecting said altitude responsive means to said timer so as to increase the period of operation thereof upon a predetermined increase in altitude.

26. For use to control expandable ice eliminating members on aircraft, the combination, comprising, a periodically operable timer, ice formation responsive means for initiating operation of said timer, and independent atmospheric pressure responsive means operatively connected to said timer so as to decrease the period of operation thereof upon a predetermined increase in atmospheric pressure.

MYRON L. TAYLOR.
WILLIAM B. POND.
HERBERT A. EAYRS.

REFERENCES CITED

The following references are of record in the file of this patent:

UNITED STATES PATENTS

| Number | Name | Date |
| --- | --- | --- |
| 2,016,147 | LaPierre et al. | Oct. 1, 1935 |
| 2,132,264 | King | Oct. 4, 1938 |
| 2,159,186 | Tyler | May 23, 1939 |
| 2,182,530 | Baer | Dec. 5, 1939 |
| 2,217,299 | Taylor | Oct. 8, 1940 |
| 2,307,620 | Clark | Jan. 5, 1943 |
| 2,332,325 | Levoy, Jr. | Oct. 19, 1943 |
| 2,337,426 | Taylor et al. | Dec. 21, 1943 |
| 2,343,918 | McCoy | Mar. 14, 1944 |
| 2,374,779 | Preston | May 1, 1945 |

FOREIGN PATENTS

| Number | Country | Date |
| --- | --- | --- |
| 339,003 | Germany | Dec. 6, 1920 |

Certificate of Correction

Patent No. 2,444,208.

June 29, 1948.

MYRON L. TAYLOR ET AL.

It is hereby certified that errors appear in the printed specification of the above numbered patent requiring correction as follows: Column 18, line 37, claim 4, for "determined" read *predetermined*; line 54, claim 5, after "of" and before "said" insert *ach of*; column 19, line 30, claim 9, after the word "period" insert a comma; and that the said Letters Patent should be read with these corrections therein that the same may conform to the record of the case in the Patent Office.

Signed and sealed this 5th day of October, A. D. 1948.

[SEAL]

THOMAS F. MURPHY,
*Assistant Commissioner of Patents.*